July 24, 1923.

O. W. GERLEMAN

METHOD OF TREATING PISTONS, PISTON RINGS, AND CYLINDERS, AND SPECIALLY PREPARED PISTON RINGS

Filed Dec. 7, 1921

1,462,855

INVENTOR
Oscar W. Gerleman
by Arthur C. Eckert ATTORNEY

Patented July 24, 1923.

1,462,855

UNITED STATES PATENT OFFICE.

OSCAR W. GERLEMAN, OF ST. LOUIS, MISSOURI.

METHOD OF TREATING PISTONS, PISTON RINGS, AND CYLINDERS, AND SPECIALLY-PREPARED PISTON RINGS.

Application filed December 7, 1921. Serial No. 520,537.

*To all whom it may concern:*

Be it known that I, OSCAR W. GERLEMAN, a citizen of the United States of America, residing at 110 South Tenth Street, in the city of St. Louis and State of Missouri, have invented certain new and useful Improvements in a Method of Treating Pistons, Piston Rings, and Cylinders and Specially-Prepared Piston Rings, of which the following is a specification.

The object of my invention is to produce a method of treating pistons, piston rings and cylinders of engines, and specially prepared piston rings.

Inasmuch as the pressure produced by an explosion in the cylinder of an internal combustion motor varies directly with the pressure to which the gas is compressed before it is exploded, it is highly advantageous to procure high compressions.

In a multi-cylinder engine it is also of extreme importance to have the compressions of all the cylinders equally high.

The difficulty does not exist in producing the compression but in maintaining it after it is produced. The piston ring is designed to prevent loss of compression. In the conventional motor, this is accomplished only approximately. What actually happens is that the compressed gases leak by the piston ring into the crank case thereby lessening the compression and hence the power, and that since leakage varies in the different cylinders, the uniformity of compression is not maintained.

Furthermore, the oil leaks from the crank case by the piston rings into the cylinders and combustion chamber in the conventional motor, causing foul plugs, the necessity of grinding valves and reboring cylinders. Likewise the unburned gasoline from the cylinder leaks by the piston into the crank case, making the oil unfit for lubricating purposes in the conventional motor.

My invention consists in a method of preventing compression losses, preventing the oil from leaking by the piston rings, preventing the necessity of valve grinding and carbon cleaning in the cylinders, preventing a mixture of gasoline with the oil in the crank case, without any mechanical appliance or adding any foreign matter to the gasoline or overhauling or mechanically changing the motor. This can be accomplished in the following manner:—The ignition of the engine is made inoperative. The spark plug is removed and through the spark plug opening a small amount of pure flake graphite is inserted when the cylinder is at the beginning of its compression stroke. A compressometer is then inserted in place of the spark plug. The crank shaft is then manually revolved so as to move the piston in its upward or compression stroke almost to the end, but not sufficiently to open the exhaust port of the cylinder. The piston is then moved down to the beginning of its upward or compression stroke and the process continued until the compression losses for the cylinder are reduced until the proper compression is registered on the compressometer.

Only the purest form of flake graphite may be used and only in small amounts. If too much is used, the piston will be caused to stick or freeze to the cylinder. The amount varies with the size and condition of the cylinder and the piston rings. An average amount to be used in one cylinder is one grain by weight per inch of cylinder diameter. Usually one application is sufficient, but never more than three are necessary. I mean by additional applications, the removing of the compressometer and the insertion of more graphite. This same operation is repeated with each cylinder until all of the compressions are alike and maximum pressure which is particularly obtainable in such engines is obtained.

The reasons for these results are resident in the fact that when the graphite is inserted as described, it volatilizes and is held in suspension in the air. Movement of the piston rubs the graphite into the cylinder walls and into the external surfaces of the piston rings, forming an absolutely smooth and solid surface on both. Within the range of temperature in such cylinders as described, the graphite will act as a perfect lubricant, decreasing the coefficient of friction between the cylinder wall and the piston rings and at the same time preventing leakage of the gases, or oil, or gasoline by the piston. The success of the operation depends principally on the amount of flake graphite employed and on its purity. The graphite fills up the pores of the surface on which it lodges and brings about the results claimed principally for that reason. An amount not to exceed one grain by weight per inch of cylinder diameter must be used.

The process forms a film over the cylinder walls and the piston rings and pistons.

It will be observed that by the operation just described, considerable amount of work is necessary in that the crank shaft must be manually rocked. Furthermore, unless the process is carried out properly, the piston will be moved by the exhaust port and the graphite will be blown through the exhaust port and, therefore, not become effective in the cylinder. My improved method obviates the necessity of rocking, prevents the graphite from being blown out of the cylinder and requires only the treatment initially of the piston ring. In the manufacture of gasoline engines, my improved device finds its largest application; but even in the repair of cylinders and pistons and piston rings in the ordinary sense, my method becomes highly efficient when the original conventional piston rings are of necessity removed.

With this and other objects in view, my invention has relation to certain novel features of construction and arrangements of parts as will be hereinafter more fully described, pointed out in the claims and illustrated in the drawings, in which—

Numeral 5 designates the engine frame and numerals 6, 7, 8, and 9 represent conventional cylinders respectively. Numerals 10, 11, 12, and 13 represent pistons in operative position in the cylinders 6 to 9 both inclusive respectively. Numeral 14 designates a crank shaft to which are secured in the conventional manner the pistons 10 to 13 both inclusive respectively, by means of the piston rods 15 to 18 both inclusive. Numeral 19 designates a conventional pressure registration means such as a compressometer which may be secured in threaded engagement in the spark plug opening.

Figure 1:
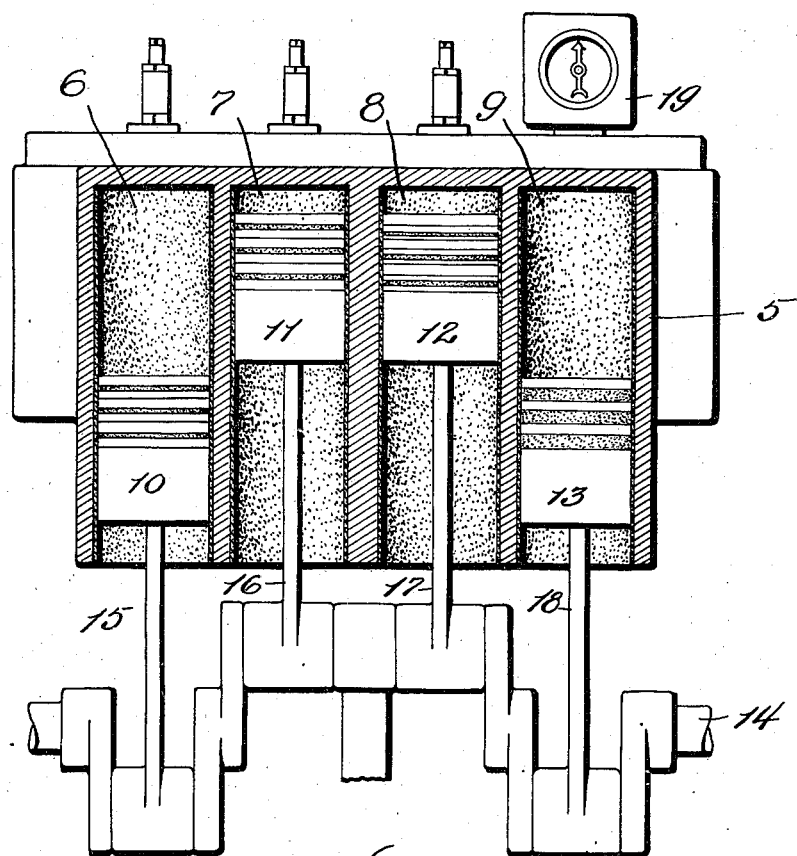
Fig. 1 represents a fragmental sectional elevation of the cylinders, pistons, piston rods and crank shaft of a conventional motor.
Figure 2:
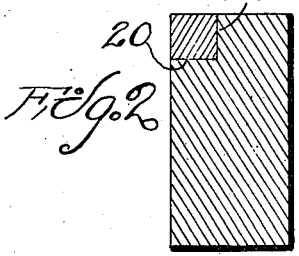
Fig. 2 represents a cross section of the preferred form of my piston ring that is to be used in my present operation.
Figure 3:
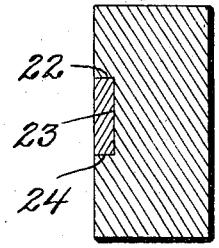
Fig. 3 represents a cross section of a modified form of piston ring to be used in my operation.

My method consists in treating the piston rings and then placing them on the pistons in operative position, and then by operating the pistons and, therefore, the piston rings in the conventional manner distributing the flake graphite to the cylinder walls, and to the operative piston ring surfaces. Pistons 10 and 11 are provided with my preferred form of piston ring shown in Fig. 2 and piston 12 is shown as treated by the modified form shown in Fig. 3. In the preferred form shown in Fig. 2 a groove is cut as indicated by the lines 20 and 21 circumferentially. A viscous paste made up of pure flake graphite and a binder such as paraffine is positioned in the groove, making its external face flush with the external faces of the piston ring. The binder used in this viscous paste must be highly combustible, and must have a low melting point. I have found that paraffine can be used very successfully. When the ring is positioned on the piston in the cylinder and the piston is moved by the engine's own power, the heat generated melts the binder holding the graphite in suspension and the movement of the piston ring distributes the graphite equally over the remainder of the external surface of the piston ring, piston and cylinder walls. The heat generated is sufficient to burn out the binder which is emitted as a vapor or smoke. By this means the piston rings can be easily handled, and nothing need be done to the cylinders or to the engine when the proper ring is placed in position. No skilled operation is necessary and the result will be perfect if the chemical composition of the binder is correct, that is to say, if the proper amount of pure flake graphite is held in suspension in it, and if the binder melts at a reasonably low melting point and if it will combust within the range of operative cylinder temperatures. For ease in handling and simplicity in manufacturing, I have devised the modified form shown in Fig. 3. In Fig. 3 the groove for holding the binder is placed substantially in the middle of the piston ring having the faces 22, 23 and 24. This groove is likewise a circumferential one. The operation of this ring is the same as that described of the preferred form. On all of the rings and in Fig. 1, I have shown the paste in similar stippled section.

What I claim and mean to secure by Letters Patent is—

1. As an article of manufacture, a piston ring having a circumferential groove formed on its lateral surface filled with graphite not to exceed one grain by weight per inch of cylinder diameter held in suspension by paraffine.

2. As an article of manufacture, a piston ring having a groove formed in its lateral surface filled with pure flake graphite, held together by a binder having a low melting point, and a low combustion temperature.

3. As an article of manufacture, a piston ring having a groove formed in its lateral surface filled with graphite, held together by a binder having a low melting point, and a low combustion temperature.

In testimony whereof I affix my signature.

OSCAR W. GERLEMAN.